United States Patent
Betting et al.

(10) Patent No.: US 9,551,526 B2
(45) Date of Patent: Jan. 24, 2017

(54) REFINING SYSTEM AND METHOD FOR REFINING A FEED GAS STREAM

(75) Inventors: Marco Betting, Rijswijk (NL); Robert Petrus Van Bakel, Rijswijk (NL); Cornelis Antonie Tjeenk Willink, Rijswijk (NL); Santosh Shettar, Rijswijk (NL)

(73) Assignee: TWISTER B.V., Rijswijk (NL)

( * ) Notice: Subject to any disclaimer, the term of this patent is extended or adjusted under 35 U.S.C. 154(b) by 931 days.

(21) Appl. No.: 13/820,207

(22) PCT Filed: Sep. 2, 2011

(86) PCT No.: PCT/NL2011/050602
§ 371 (c)(1),
(2), (4) Date: Apr. 18, 2013

(87) PCT Pub. No.: WO2012/030223
PCT Pub. Date: Mar. 8, 2012

(65) Prior Publication Data
US 2013/0192296 A1  Aug. 1, 2013

(30) Foreign Application Priority Data
Sep. 3, 2010  (WO) ............... PCT/NL2010/050557

(51) Int. Cl.
*F25J 3/02*  (2006.01)
*B01D 53/00*  (2006.01)
(Continued)

(52) U.S. Cl.
CPC ............ *F25J 3/0209* (2013.01); *B01D 53/002* (2013.01); *B01D 53/263* (2013.01); *B01D 53/28* (2013.01);
(Continued)

(58) Field of Classification Search
CPC ........ F25J 3/0209; F25J 3/0233; F25J 3/0238; F25J 3/0242; F25J 3/0266; F25J 3/061; F25J 3/0635; F25J 3/067; F25J 2200/02; F25J 2205/04; F25J 2200/74; F25J 2210/04; F25J 2210/06; F25J 2210/80; F25J 2210/60; F25J 2215/80; F25J 2215/60; F25J 2220/02; F25J 220/66; F25J 2220/68; F25J 2220/80; F25J 2220/82; F25J 2220/84; F25J 2240/60; B01D 2257/504; B01D 2256/24; B01D 2256/245; B01D 2256/22; C10L 3/104; Y02C 10/12
See application file for complete search history.

(56) References Cited

U.S. PATENT DOCUMENTS

| 2003/0000698 A1* | 1/2003 | Lecomte | B01D 53/002 166/266 |
| 2004/0244415 A1 | 12/2004 | Paradowski | |
| 2007/0227186 A1* | 10/2007 | Alferov | B01D 5/0033 62/620 |

FOREIGN PATENT DOCUMENTS

| WO | 03/029739 | 4/2003 |
| WO | 2006/032139 | 3/2006 |

(Continued)

OTHER PUBLICATIONS

International Search Report dated Nov. 23, 2011, corresponding to PCT/NL2011/050602.

*Primary Examiner* — Keith Raymond
(74) *Attorney, Agent, or Firm* — Young & Thompson

(57) ABSTRACT

A refining system for refining a feed gas (10) includes a first and a second component, the first component having a lower dew point temperature than the second component; the refining system including:—an input section (105) for input
(Continued)

of the feed gas including a dehydration unit for dehydrating the feed gas, capable of obtaining a water dew point between −45 and −65° C.;—a pre-cooling section (110) coupled to the input section for receiving the dehydrated feed gas;—a fractionation section (115) coupled to the pre-cooling section for receiving the pre-cooled stream;—an expansion cooling and separation section (120) coupled to the fractionation section for receiving the fractionated gas, including a cyclonic separator device (240); the expansion cooling and separation section having an reflux conduit coupled to the fractionation section for reflux (24) of liquid enriched with the second component to the fractionation section.

30 Claims, 7 Drawing Sheets

(51) Int. Cl.
*B01D 53/26* (2006.01)
*B01D 53/28* (2006.01)
*C10L 3/10* (2006.01)
*F25J 3/06* (2006.01)
*F25J 1/00* (2006.01)

(52) U.S. Cl.
CPC .............. *C10L 3/104* (2013.01); *C10L 3/106* (2013.01); *F25J 1/00* (2013.01); *F25J 3/0233* (2013.01); *F25J 3/0266* (2013.01); *F25J 3/061* (2013.01); *F25J 3/067* (2013.01); *F25J 3/0635* (2013.01); *B01D 2252/10* (2013.01); *B01D 2256/22* (2013.01); *B01D 2256/24* (2013.01); *B01D 2256/245* (2013.01); *B01D 2257/304* (2013.01); *B01D 2257/504* (2013.01); *F25J 2200/02* (2013.01); *F25J 2200/74* (2013.01); *F25J 2205/04* (2013.01); *F25J 2205/10* (2013.01); *F25J 2205/20* (2013.01); *F25J 2205/40* (2013.01); *F25J 2210/04* (2013.01); *F25J 2215/04* (2013.01); *F25J 2215/80* (2013.01); *F25J 2220/60* (2013.01); *F25J 2220/68* (2013.01); *F25J 2230/08* (2013.01); *F25J 2230/60* (2013.01); *F25J 2240/02* (2013.01); *F25J 2240/40* (2013.01); *F25J 2245/02* (2013.01); *F25J 2260/80* (2013.01); *F25J 2270/02* (2013.01); *F25J 2270/06* (2013.01); *Y02C 10/12* (2013.01)

(56) References Cited

FOREIGN PATENT DOCUMENTS

| WO | 2006/108820 | 10/2006 |
|---|---|---|
| WO | 2007/030888 | 3/2007 |
| WO | 2009/002174 | 12/2008 |
| WO | 2009/084945 | 7/2009 |
| WO | 2010/014008 | 2/2010 |

* cited by examiner

REFINING SYSTEM AND METHOD FOR REFINING A FEED GAS STREAM

FIELD OF THE INVENTION

The present invention relates to a refining system for refining a feed gas stream comprising a first component and at least a second component. Also, the present invention relates to a method for refining a gas stream comprising a first component and at least a second component.

BACKGROUND

Depending on gas field conditions natural gas streams of methane and other volatile hydrocarbons as first component are mixed with varying amounts of a second component such as $CO_2$ (carbon dioxide).

Traditionally, $CO_2$ (carbon dioxide) is removed from natural gas streams by selective dissolving the $CO_2$ (solute) in a solvent. The solute and the solvent are contacted in a counter-current column (packed/trays). However, one of the disadvantages of such an absorption process is that it becomes less efficient when the $CO_2$ concentration in the feed stream exceeds 30 mole %.

Moreover, the $CO_2$ laden solvent is regenerated at low pressure (close to atmospheric pressure) such that a large volume of $CO_2$ gas is produced. With more stringent $CO_2$ emission regulations to come, this large $CO_2$ volume exhibits a big problem for further handling (i.e., sequestration/further processing).

For larger $CO_2$ contents in natural gas cryogenic (>30 mole %) cooling methods are available which (partially) liquefy the $CO_2$ rich natural gas stream using refrigeration and subsequently feed said liquefied stream to a fractionation column to strip out the light end hydrocarbon fractions by re-boiling the bottom stream such that a liquefied $CO_2$ enriched stream exits the bottom of the column In the column top the gas overhead is cooled such that a $CO_2$ depleted gaseous stream is produced and a cold liquid is refluxed to the top tray of the column The main disadvantage of such cooling and fractionation process is that $CO_2$ left in the gas overhead is still >15 mole % which requires further treatment (e.g., by absorption processes). Another disadvantage is the relatively large amount of heavier hydrocarbons which are lost via the column bottom stream. More sophisticated cryogenic processes comprise advanced columns which can operate in the solid phase of $CO_2$ and in that way create a pure $CO_2$ stream (since solidified $CO_2$ does not contain hydrocarbons). Said advanced columns can produce a gas overhead with <2% mole $CO_2$ due to the operation of these columns at extremely low temperatures (~$-85°$ C.). Therefore, the main disadvantage of these sophisticated cryogenic processes is the excessive cooling duties required to operate the column at these low temperatures.

More recently, membrane technology has been applied for selective removal of $CO_2$ from natural gas streams. The $CO_2$ is dissolved in the top layer of the membrane and transported through the membrane by diffusion hence driven by difference in partial $CO_2$ pressure between the feed and permeate side of the membrane. The main disadvantage of membranes is the relatively high slip stream of light hydrocarbons which remains in the $CO_2$ enriched, low pressure permeate stream. This permeate stream therefore requires further treatment by boosting the pressure and recycle said permeate to the feed side of the membrane or to a second stage membrane system. The latter causing a further increase in the required membrane surface. As a consequence the total required membrane surface to treat large amounts of $CO_2$ in natural gas is enormous and therefore practically impossible for large gas fields. A further disadvantage of membranes is their sensitivity to heavier hydrocarbons, water and fine solid matter, which will significantly reduce the flux and selectivity (i.e., performance) of the membrane over time. To counteract said fouling problems large scale pre-treatment processes are required for robust membrane operations.

SUMMARY OF THE INVENTION

It is an objective of the present invention to overcome or mitigate one or more of these disadvantages—associated with the state of the art technology—by offering a refining system and method for refining a feed gas stream.

According to an aspect, there is provided a refining system for refining a feed gas stream comprising a first component and a second component, the first component having a lower dew point temperature than the second component; the refining system comprising:

an input section for input of the feed gas stream comprising a dehydration unit for dehydrating the feed gas stream, capable of obtaining a water dew point of the feed gas stream between $-45°$ C. and $-65°$ C.;

a pre-cooling section coupled to the input section for receiving the dehydrated feed gas stream, the pre-cooling section being arranged for pre-cooling the received feed gas stream below a dew point of the gas such that a mixed stream comprising a liquid enriched with the second component and gas stream enriched with the first component is formed;

a fractionation section coupled to the pre-cooling section for receiving the pre-cooled mixed stream, the fractionation section having being arranged for fractionating the pre-cooled mixed stream into a first fractionated stream of gas enriched with the first component at a first separation outlet and a second fractionated stream of a liquid enriched with the second component at a second separation outlet;

an expansion cooling and separation section coupled to the fractionation section for receiving the first fractionated gas stream, comprising a fluid separator device, being arranged for—at an inlet receiving the first fractionated gas stream,—expanding the first fractionated gas stream, thereby further cooling the first fractionated gas stream to a temperature and pressure below the dew point of the gas;—separating the cooled first fractionated gas stream into a cooled low density fluid fraction, which is second component depleted and first component enriched, and a cooled high density fluid fraction which is second component enriched and first component depleted;—creating a first flow of the cooled low density fluid fraction at a first flow outlet and a second flow of the cooled high density fluid fraction at a second flow outlet, separated from the first flow; the expansion cooling and separation section further being arranged for separating a further liquid enriched with the second component from the second flow of the cooled high density fluid fraction, and having an reflux conduit coupled to the fractionation section for reflux of the further liquid enriched with the second component to the fractionation section, and wherein the expansion cooling and separation section further comprises a crystallization separator vessel coupled to the second outlet of the separator, arranged for receiving the second flow of the separator and for separating the further liquid enriched with the second component from the second flow of the cooled high density fluid fraction, wherein the crystallization separator vessel being arranged for solidifying the second component from the second flow of the cooled high density fluid fraction, the second component solids being melted in the bottom section of the crystallization vessel as the further liquid enriched with the second component from the second flow of the cooled high density fluid fraction; the crystallization separator vessel having an outlet for the further liquid that is coupled to an upper part of the fractionation section via a reflux conduit.

According to an aspect, there is provided a method for refining a gas stream comprising a first component and a second component, the first component having a lower dew point temperature than the second component;
the method comprising in sequence:
a) receiving the gas stream for dehydrating the feed gas stream, with a water dew point of the feed gas stream between −45° C. and −65° C.;
b) pre-cooling the received feed gas stream below a dew point of the gas such that a mixed stream comprising a liquid enriched with the second component and gas stream enriched with the first component is formed;
c) fractionating the pre-cooled mixed stream into a first fractionated stream of gas enriched with the first component at a first separation outlet and a second fractionated stream of a liquid enriched with the second component at a second separation outlet;
d) expansion cooling and separating of the first fractionated gas stream, comprising—receiving the first fractionated gas stream,—expanding the first fractionated gas stream to supersonic velocity, thereby further cooling the first fractionated gas stream to a temperature and pressure below the dew point of the gas,—separating the cooled first fractionated gas stream into a cooled low density fluid fraction, which is second component depleted and first component enriched, and a cooled high density fluid fraction which is second component enriched and first component depleted;—creating a first flow of the cooled low density fluid fraction at a first flow outlet and a second flow of the cooled high density fluid fraction at a second flow outlet, separated from the first flow, and—separating a further liquid enriched with the second component from the second flow of the cooled high density fluid fraction, and refluxing the further liquid enriched with the second component to the fractionation step using crystallization separation, arranged for receiving the second flow and for separating the further liquid enriched with the second component from the second flow of the cooled high density fluid fraction, wherein the crystallization separation is arranged for solidifying the second component from the second flow of the cooled high density fluid fraction, the second component solids being melted as the further liquid enriched with the second component from the second flow of the cooled high density fluid fraction, the further liquid being refluxed to the fractionation section.

Advantageous embodiments are further defined by the dependent claims.

In a preferred embodiment, the first component comprises one or more of typical natural gas constituents; methane (C1), ethane (C2), propane (C3), n-butane (nC4), iso-butane (iC4) and higher alkanes (C5+) and its isomers as well as one or more of the inert gases not limited to nitrogen (N2), hydrogen (H2), helium (He), carbon monoxide (CO) and/or oxygen (O2). The second component comprises carbon dioxide (CO2) and/or hydrogen sulfide (H2S).

BRIEF DESCRIPTION OF DRAWINGS

The invention will be explained in more detail below with reference to a few drawings in which illustrative embodiments thereof are shown. They are intended exclusively for illustrative purposes and not to restrict the inventive concept, which is defined by the claims.

DESCRIPTION OF EMBODIMENTS

In practice, gas field conditions can vary with respect to the CO2 concentration in the feed gas stream, the available feed pressure and required export pressure, the required export concentration of CO2 in the export gas stream after refining (i.e. so-called "sales gas") and the required hydrocarbon recovery from the produced CO2 liquid. Each gas field development will therefore require a tailored process design. However, the generic process (block) scheme as presented in this invention will be similar for all field conditions.

Figure 1:
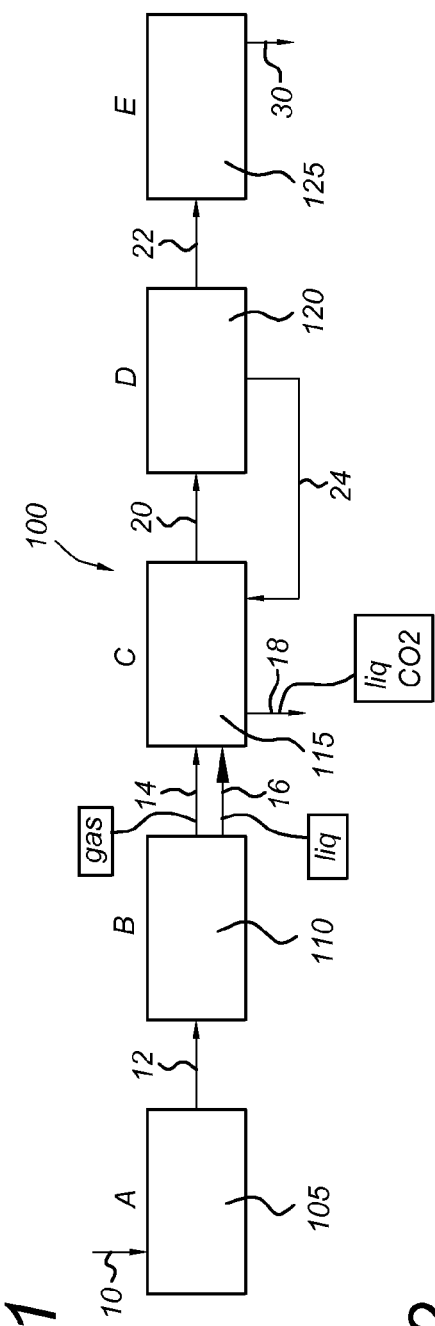
FIG. 1 shows a processing scheme according to the present invention.

FIG. 1 shows a processing scheme 100 according to the present invention.

The processing scheme comprises a number of processing stages or blocks 105, 110, 115, 120, 125 that process/refine a feed gas stream 10 into an export gas stream 30.

A refining system according to the processing scheme 100 comprises a first processing block 105 for dehydrating the gas stream, a second processing block 110 for pre-cooling the gas stream, a third processing block 115 for fractionation of the gas stream, a fourth processing block 120 for expansion cooling of the fractionated gas stream and a fifth processing block 125 for compression of the gas stream.

The first processing block 105 is arranged for dehydrating the feed gas stream 10 and has an output for a dehydrated gas stream 12, coupled to an input of the second processing block 110.

The second processing block 110 is arranged for pre-cooling the dehydrated gas stream 12 and has an output for the pre-cooled mixed stream 14+16 comprising both a gas and liquid phase, coupled to an input of the third processing block 115. Additionally, the second processing block may comprise a separator to produce a first output 14 containing the gas stream coupled to a first input of the third processing block 115 and a second output for the liquid stream 16 enriched with the second component which is coupled to a second input of the third processing block 115.

The third processing block 115 is arranged for fractionation of the streams 14 and 16 and has an output for the fractionated gas stream 20 to the fourth processing block 120. Additionally, the third processing block 115 has a second output for discharging a liquid stream 18 enriched with the second component. The processing scheme may be arranged for re-injecting the stream 18 as by product into a reservoir.

The fourth processing block 120 is arranged for expansion cooling of the fractionated gas stream 20. The fourth processing block 120 is arranged for expanding the fractionated gas stream, thereby further cooling the fractionated gas stream to a temperature and pressure below the dew point of the gas to form a liquid fraction enriched with the second component, and separating said liquid fraction from the stream into a gas stream 22, which is second component depleted and first component enriched, and a cooled liquid stream 24 which is second component enriched and first component depleted. Typically such expansion cooling and separating of the fractionated gas stream is performed by a fluid separator device preferably a supersonic cyclonic fluid separator, as described below in more detail.

The fourth processing block has a first output for the gas stream 22 which is coupled to an inlet of the fifth processing block 125 for compression of the gas stream.

The fourth processing block has a second output for the cooled liquid stream 24 which is coupled to a further inlet of the third processing block for fractionation 115. The cooled liquid stream 24, typically liquid CO2 and a small amount of hydrocarbons, is refluxed to the fractionation process for further separation of the first and second components (hydrocarbons and carbon dioxide, respectively).

The fifth processing block 125 is arranged for compression of the cooled gas stream 22 into the export gas stream 30.

The processing blocks 105, 110, 115, 120, 125 presented above can entail different types of unit operations and are selected such that field-specific conditions are best satisfied. Key to the present invention is that expansion cooling is applied at least once downstream of the fractionation process where the temperatures are already low, typically lower than −40° C. Thermodynamically, expansion cooling becomes more efficient compared to refrigeration cooling in the low temperature range because the 'Coefficient of Performance' of refrigeration cycles will drop below 1 once the refrigerant temperature is lower than approx. −50° C.

In the presented scheme of FIG. 1 the feed gas stream 10 (ambient cooled natural gas stream) will be dehydrated by removing free water from the gas stream and thereafter by (partially) removing the water vapor, down to a dew point temperature typically 5° C. below the lowest temperature in the fractionation column This results in typical required water dew point between −45° C. and −65° C. These dew points can be met using for example a Glycol dehydration unit, a Silica gel unit or Molsieves depending on the required operating pressure.

After the dehydration unit the dehydrated gas stream (dry gas) is pre cooled using internal coolers or cross exchangers such as Gas-Liquid Heat exchangers (GLHEX) and/or Gas-Gas heat exchangers (GGHEX) depending on the availability of cold process streams, and/or external coolers such as Propane Chillers, CFC Chillers, CO2 Chillers depending on the required column temperature and HSE regulations, and/or expansion devices such as JT-valves and/or turbo expanders depending on the available free pressure in the feed stream and the resulting Liquid Volume Fraction in stream 14 after pre cooling.

After the dehydrated gas stream is pre-cooled and a substantial part of the dehydrated gas stream is liquefied, each of these flows is fed to the fractionation column in which the methane is stripped from the liquid by adding heat duty. To enable said demethanizer function a pressure in the fractionation column will be preferably between 30-65 bar (1 bar=$10^5$ N/m$^2$) depending on the CO2 concentration in stream 12 and the required methane concentration in the CO2 rich liquid stream 18.

Alternatively, the fractionation column can be replaced by a series of flashes with intermediate separation in order to separate methane from liquid CO2. These flashes can be performed either using choke valves, turbo expanders or Cyclonic Fluid degassers (such as disclosed in WO2008000753). The lowest pressure in this flash series typically ranges between 5-20 bar depending on the maximum allowable methane fraction in the produced CO2 liquid stream 18.

The gas overhead of the fractionation step, is cooled such that a cold CO2 depleted gas stream i.e. the fractionated gas stream 20 is produced to enter the expansion unit at a temperature typically in the range from −35 to −65° C.

The expansion unit can be for instance a JT valve, turbo expander or a supersonic cyclonic separator (see e.g., WO0329739).

From thermodynamic considerations a more isentropic expansion device is preferred (which eliminates the JT valve) whilst from mechanical perspective a device which can handle solidified matter is preferred (which eliminates the turbo expander). Therefore the preferred expansion device is a supersonic cyclonic separator.

In the supersonic cyclonic separator the fractionated gas stream is expanded such that the static pressure drops with a factor 2 to 10 depending on the maximum allowable CO2 content in the export gas.

The associated static temperature inside the cyclonic separator can be as low as −120° C. At these conditions solid CO2 can form according to equilibrium conditions.

However, in devices of the cyclonic separator type, the retention time is only in the order of milliseconds. The time rate of CO2 solid formation will be suppressed by the free energy of formation so that most of the condensed CO2 will remain as a supercooled liquid phase with a small fraction of submicron size CO2 crystals. This supercooled CO2 liquid together with some slip gas (i.e. a small amount of gaseous components) is fed to a crystallization vessel in which (a part of) the supercooled liquid enriched with CO2, will solidify and subsequently separated into at least a CO2 solid stream and a gaseous stream and in some cases also a liquid stream. The CO2 solids are melted in the bottom section of the crystallization vessel and can be produced as a separated stream or can be combined with the remaining liquid phase produced by the crystallization vessel. A suitable crystallization vessel is disclosed in WO2009084945. The CO2 depleted gas stream exiting the cyclonic separator is recompressed in the diffuser section of the cyclonic separator and brought to export pressure with an export compressor unit. The CO2 enriched liquids exiting the crystallization vessel are returned to the fractionation column in one of the upper trays. The CO2 depleted gas flow exiting the crystallization vessel (slip gas) is either returned mixed with the CO2 depleted gas flow exiting the cyclonic separator or can be recompressed to feed pressure and mixed with the dry feed stream entering the pre-cooling section 110 of the process.

Figure 2:
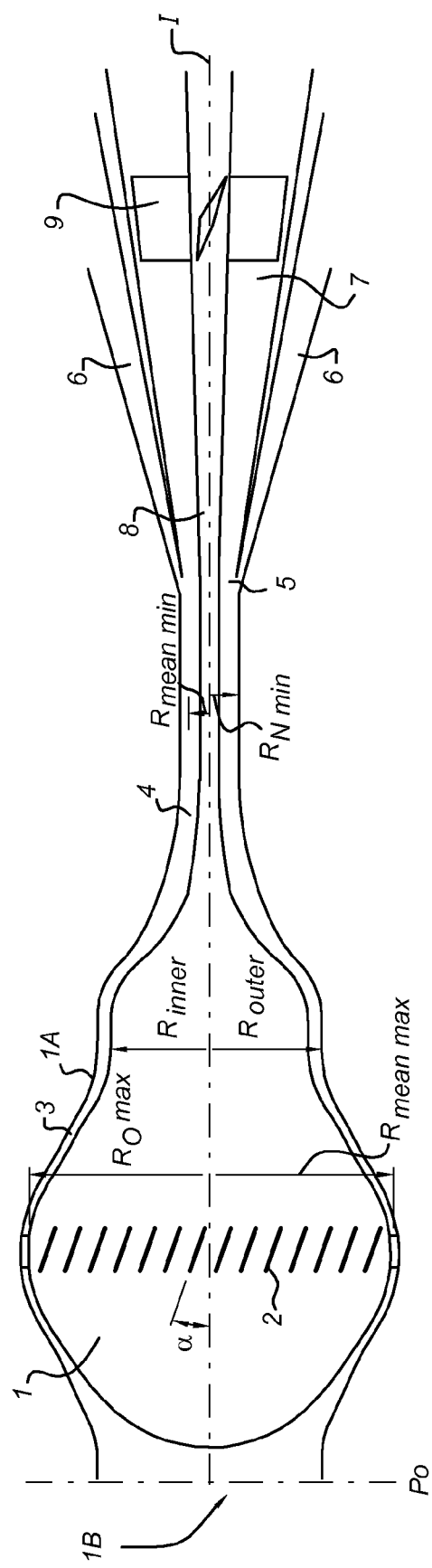
FIG. 2 shows schematically a fluid separator device for use in the present invention.

FIG. 2 depicts a longitudinal sectional view of a fluid separator device, which in this text may be referred to as a supersonic cyclonic fluid separator or a cyclonic inertia separator.

Referring now to FIG. 2, there is shown a cyclonic inertia separator which comprises a swirl inlet device comprising a pear-shaped central body 1 on which a series of swirl imparting vanes 2 is mounted and which is arranged coaxial to a central axis I of the separator and inside the separator such that an annular flow path 3 is created between the central body 1 and separator.

The cyclonic separator has an inlet 1B for receiving a fluid stream to be separated.

The width of the annulus 3 is designed such that the cross-sectional area of the annulus gradually decreases downstream of the swirl imparting vanes 2 such that in use the fluid velocity in the annulus gradually increases and reaches a supersonic speed at a location downstream of the swirl imparting vanes.

The separator further comprises a tubular throat portion 4 from which, in use, the swirling fluid stream is discharged into a diverging fluid separation chamber 5 which is equipped with a central primary outlet conduit 7 for gaseous components (i.e., the cooled low density fluid fraction) and with an outer secondary outlet conduit 6 for condensables enriched fluid components (i.e., the cooled high density fluid fraction 24). The central body 1 has a substantially cylindrical elongate tail section 8 on which an assembly of flow straightening blades 9 is mounted. The central body 1 has a largest outer width or diameter $2R_{o\ max}$ which is larger than the smallest inner width or diameter $2R_{n\ min}$ of the tubular throat portion 4.

The various components of the cyclonic fluid separator as shown in FIG. 1 are described below.

The swirl imparting vanes 2 which are oriented at an angle ($\alpha$) relative to the central axis I create a circulation in the fluid stream. The angle $\alpha$ may be between 20° and 60°. The fluid stream is subsequently induced to flow into the annular flow area 3. The cross-sectional surface of this area is defined as:

$$A_{annulus} = \pi(R_{outer}^2 - R_{inner}^2)$$

The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}.$$

At the maximum value of the mean annulus radius $R_{mean,\ max}$ the fluid stream is flowing between the assembly of swirl imparting vanes 2 at a velocity (U), which vanes deflect the flow direction of the fluid stream proportional to the deflection angle ($\alpha$) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,\ max}$ to $R_{mean,\ min}$.

It is considered that during this annular expansion two processes occur:

(1) The heat or enthalpy (h) in the flow decreases with the amount $\Delta h = -\tfrac{1}{2}U^2$, thereby condensing those flow constituents which first reach phase equilibrium. This results in a swirling mist flow containing small liquid or solid particles.

(2) The tangential velocity component $U_\phi$ increases inversely with the mean annulus radius substantially in accordance with the equation $$U_{\phi,\ final} = U_{\phi,\ initial} \cdot (R_{mean,\ max}/R_{mean,\ min}).$$

This results in a strong increase of the centrifugal acceleration of the fluid particles ($a_c$), which will finally be in the order of:

$$a_c = (U_{\phi,\ final}^2 / R_{mean,\ min}).$$

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing 1A, which is called the separation area. The time period for the particles to drift to this outer circumference of the flow area determines the length of the tubular throat portion 4. It is understood that particles may include solid or solidified particles.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components are discharged into an outer secondary fluid outlet 6 via one or a series of slots, (micro) porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy.

The diverging primary outlet conduit may be equipped with an assembly of flow straightening vanes 9 to recover the circulation energy.

The term fluid as used here refers to the liquid, the gaseous phase, as well as a combination of liquid and gaseous phases.

The swirl imparting vanes 2 may be replaced with other suitable swirl imparting devices. For instance, the swirl imparting vanes 2 may be formed by providing a tangential inflow of the fluid.

The flow straightening vanes 9 may be replaced with other suitable flow straightening devices.

Below some embodiments of refining systems in accordance with the present invention are described.

Figure 3:
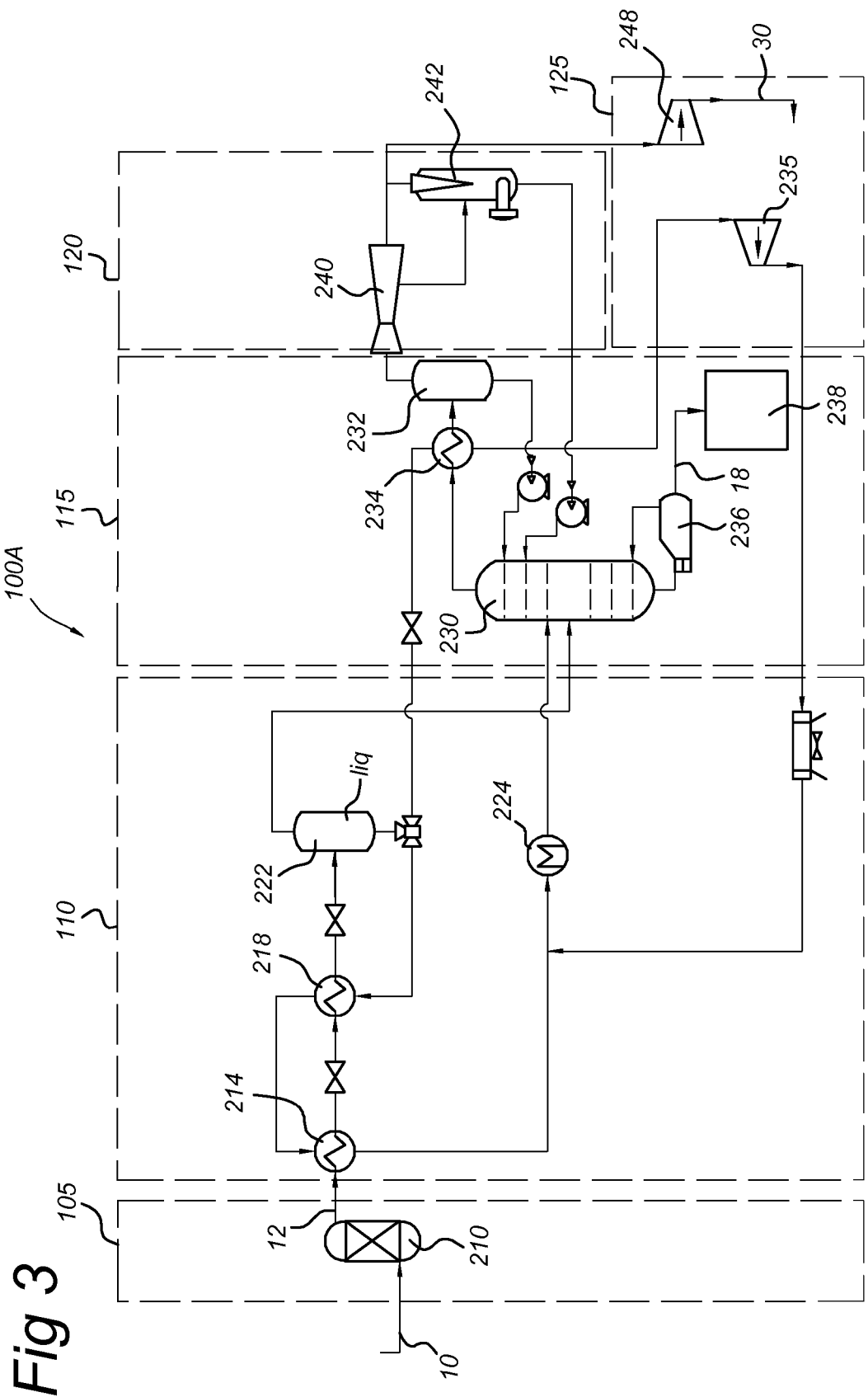
FIG. 3 shows schematically a refining system according to an embodiment.

FIG. 3 shows schematically a refining system 100A according to an embodiment.

The refining system 100A comprises the first processing block 105 for dehydrating the gas stream (a dehydration section), the second processing block 110 for pre-cooling the gas stream (a pre-cooling section), the third processing block 115 for fractionation of the gas stream (a fractionation section), the fourth processing block 120 for expansion cooling of the feed gas stream (an expansion cooling section) and the fifth processing block 125 for compression of the gas stream (a compressor section) as described above with reference to FIG. 1.

The embodiment of the refining system 100A may be suitable for relatively high CO2 content of the feed gas typically in the range of 50-90 mole % of CO2. In an example, the feed gas stream from the gas field comprises natural gas with about 70 mole % CO2.

In the dehydration section 105, the feed gas stream 10 from the gas field passes a dehydration unit 210 for forming a dehydrated gas stream 12.

Next, the dehydrated gas stream 12 enters the pre-cooling section 110. The pre-cooling section comprises one or more pre-cooling units (heat exchangers) 214, 218 coupled in series which are arranged to cool the dehydrated gas stream such that in a preferred embodiment said stream reaches a temperature in a range of −30 to −20° C. A pre-cooler separator vessel 222 is coupled to an output of the one or more pre-cooling units for receiving the cooled dehydrated stream.

An output of the pre-cooler separator vessel 222 for producing a CO2 enriched liquid stream is coupled to the one or more pre-cooling units for use of said liquid stream as coolant. After passing the one or more pre-cooling units 214, 218, said liquid stream or part thereof will be evaporated and is cooled in a chiller 224 down to a preferred temperature range of −5° to −15° C., and passed to the fractionation section 115 for entering a fractionation device 230 (for example, a fractionation column).

A further output of the pre-cooler separator vessel 222 for a gaseous component is coupled to an input of the fractionation device 230.

The fractionation section comprises a fractionation device or column 230, a reboiler 236, a heat exchanger 234 and a fractionation separator vessel 232.

The fractionation device or column 230 has a top outlet for low density components which is coupled through the heat exchanger 234 to an inlet of the fractionation separator vessel 232. The heat exchanger 234 is coupled to the output of the pre-cooler separator vessel 222 for a CO2 enriched liquid stream for receiving said liquid stream as coolant. Said liquid stream is flashed to a pressure ranging between 5 and 20 bar, typically about 10 bar, and a temperature ranging between −65 and −30° C. typically about −58° C. Said liquid stream will evaporate (in part) in the heat exchanger and is subsequently compressed by compressor 235 and then introduced through the chiller 224 into the fractionation device 230.

A bottom outlet for high density components of the fractionation device is coupled to an inlet of the reboiler 236. The reboiler has the function to boil off low density components that were mixed with the high density components from the fractionation device.

An output for low density components of the reboiler is coupled to an inlet of the fractionation device for reintroducing the low density components. An output for high density components 18 (substantially liquid CO2) is coupled to a facility 238 for re-injecting CO2 into a reservoir via an injection well.

The fractionation separator vessel 232 has an output for liquid components enriched in the second component (e.g. CO2) that is coupled to the fractionation device 230 for reintroduction of the liquid components in an upper part of the fractionation device. Said reflux of cold CO2 liquids primarily serves to cool the upper part of the fractionation column 230 and secondly it may absorb trace amounts of water vapor present in the lower feed stream entering said fractionation device.

Further, the fractionation separator vessel has an output for the gas stream depleted in the second component (e.g. CO2), that is coupled to an inlet of the supersonic cyclonic separator 240 of the expansion cooling section 120.

Basically, in the fractionation section 115, the pre-cooled dehydrated gas stream (the gaseous component and the liquid component) is separated into a first separated stream of gas enriched with hydrocarbons as the first component and a second separated stream of liquid enriched with liquid CO2 as the second component.

Thus, in an exemplary embodiment, the gas components from the fractionation separator vessel are introduced as the first separated stream of gas enriched with hydrocarbons into the supersonic cyclonic separator of the expansion cooling section 120 at a pressure ranging from 55-65 bar more preferably about 60 bar and at a temperature ranging between −55 and −20° C., more preferably of about −45° C.

In the expansion cooling section 120, the secondary outlet conduit 6 of the supersonic cyclonic separator 240 is connected to a crystallization vessel 242 which is arranged with a bottom outlet for liquid components enriched in the second component and a top outlet for low density (gas) components.

The bottom outlet of the vessel 242 is coupled to an inlet in an upper part of the fractionation device 230 for receiving the reflux stream 24 of the CO2 enriched liquid stream. Said reflux of cold CO2 liquid primarily serves to cool the upper part of the fractionation column 230 and secondly it may absorb trace amounts of water vapor present in the lower feed stream entering said fractionation device. The top outlet of the vessel 242 is coupled to the primary outlet conduit of the cyclonic separator 240 which is further coupled to a compressor 248 in the compressor section 125 for compressing the cooled gas stream 22 (from the cyclonic separator 240) and the low density (gas) components (from the vessel 242) into the export gas stream 30. Both the bottom outlets of vessels 232 and 242 may be coupled to the dehydration section for receiving at least a part of the cold CO2 enriched liquid and mixing it with the feed gas stream so as to absorb at least a part of the water vapor in the CO2 liquid fraction. Because the cold CO2 liquid produced from vessels 232 and 242 is very lean in water, it can be used as a desiccant.

Figure 4:
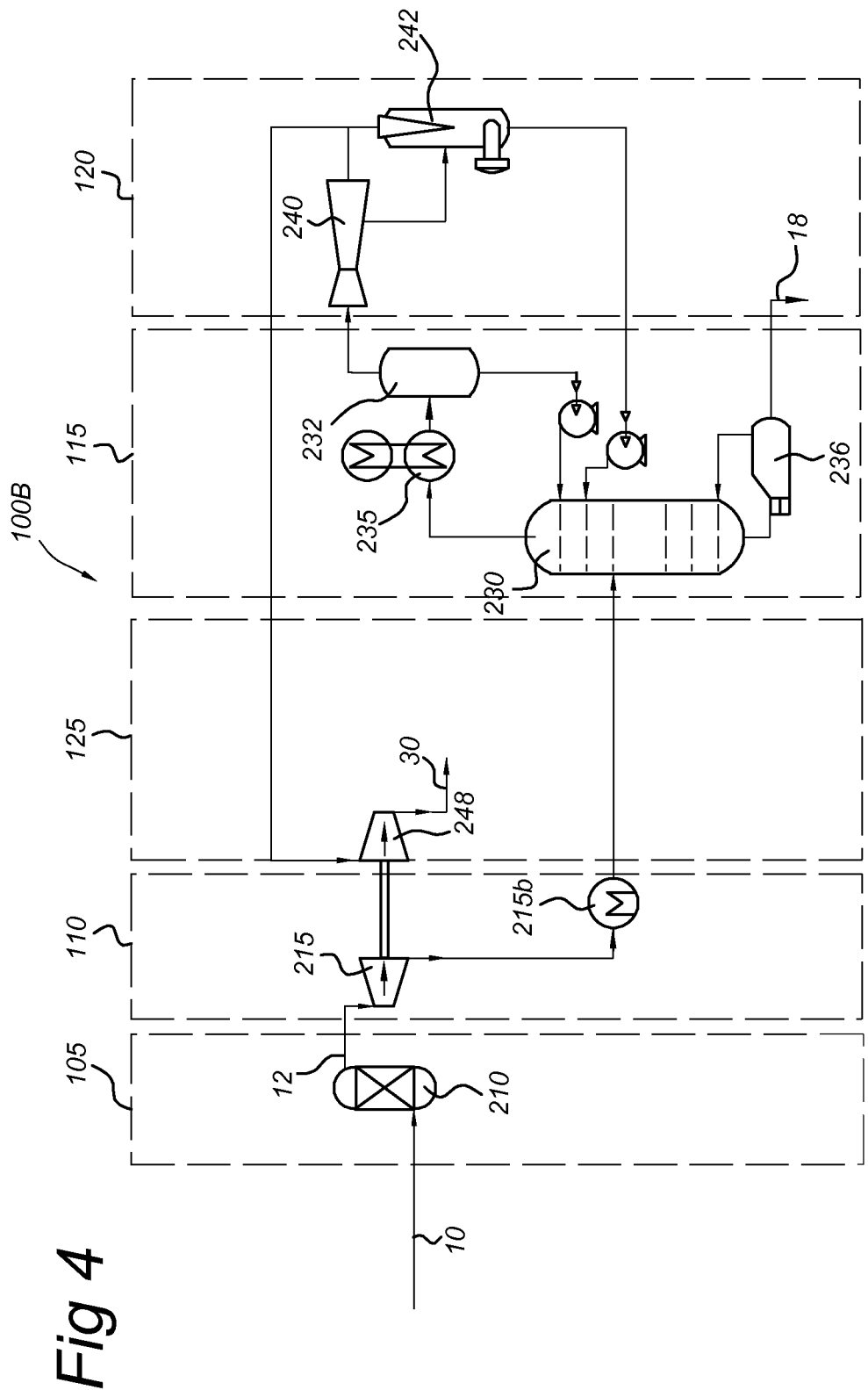
FIG. 4 shows schematically a refining system according to an embodiment.

FIG. 4 shows schematically a refining system 100B according to an embodiment.

The refining system 100B comprises the first processing block 105 for dehydrating the gas stream (a dehydration section), the second processing block 110 for pre-cooling the gas stream (a pre-cooling section), the third processing block 115 for fractionation of the gas stream (a fractionation section), the fourth processing block 120 for expansion cooling of the feed gas stream (an expansion cooling section) and the fifth processing block 125 for compression of the gas stream (a compressor section) as described above with reference to FIG. 1.

In FIG. 4, entities with the same reference number as shown in a preceding figure refer to corresponding entities. Such entities are either substantially identical or equivalent to the corresponding entities in the preceding figure and will not be described here in detail.

The embodiment of the refining system 100B may be suitable for relatively high CO2 content of the feed gas. In an example, the feed gas stream 10 from the gas field comprises natural gas with about 70 mole % CO2.

In the refining system 100B according to the embodiment, the pre-cooling section 110 comprises a turbo expander stage 215 coupled with a chiller device 215b.

The dehydrated feed gas stream 12 enters the turbo expander 215 and is pre-cooled by the expansion. In an exemplary embodiment, the dehydrated feed gas stream 12 is pre-cooled to a temperature ranging between −25 and 5° C. with a pressure ranging from 45-65 bar. In the chiller device 215b the expanded feed gas stream is further pre-cooled to typically about −30° C.

In this embodiment, the compressor 248 of the compression section 125 is mechanically coupled to the turbo expander 215. The compressor 248 is driven by the expanding (dehydrated) feed gas stream 12.

After passing the pre-cooling section 110, the pre-cooled feed gas stream enters the fractionation device 230 in the fractionation stage 115. In an exemplary embodiment, the pre-cooled feed gas stream enters the fractionation stage 115 at a pressure between 45 and 65 bar, preferably at about 60 bar.

The fractionation stage 115 is similar to the fractionation stage as shown in FIG. 3. In this embodiment, the top outlet of the fractionation device 230 for low density components is coupled to a cascade chiller for further cooling the stream of low density components down to a temperature ranging between −65 and −45° C., preferably about −64° C. After passing the cascade chiller 235, the stream of low density components enters the fractionation separator vessel 232.

Figure 5:
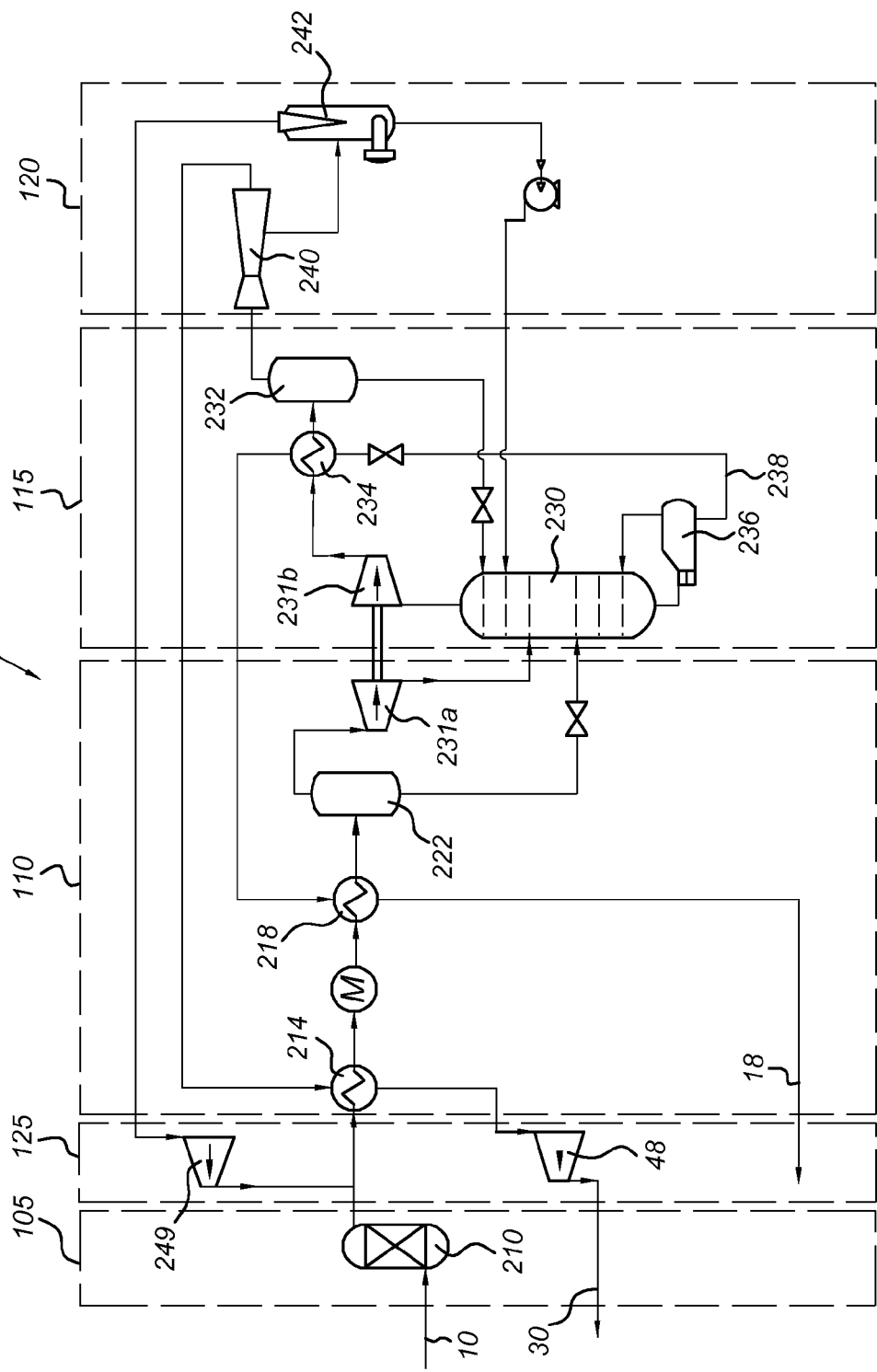
FIG. 5 shows schematically a refining system according to an embodiment.

FIG. 5 shows schematically a refining system 100C according to an embodiment.

The refining system 100C comprises the processing blocks 105, 110, 115, 120, 125 as described above with reference to FIG. 1.

In FIG. 5, entities with the same reference number as shown in a preceding figure refer to corresponding entities. Such entities are either substantially identical or equivalent to the corresponding entities in the preceding figure and will not described here in detail.

The embodiment of the refining system 100C may be suitable for relatively moderate CO2 content of the feed gas ranging from typically 35-60 mole % CO2. In an example, the feed gas stream 10 from the gas field comprises natural gas with about 50 mole % CO2.

The pre-cooling section 110 of the embodiment of the refining system 100C is very similar to that of the embodiment of refining system 100A, except that the top outlet of the pre-cooler separator vessel 222 is coupled to an inlet of a turbo expander 231A. The turbo expander 231A is arranged for further pre-cooling the dehydrated feed gas stream (after passing the cooling units 214, 218) by expansion to in an exemplary embodiment, a pressure ranging from 25 to 55 bar, typically about 49 bar, and a temperature ranging from −55 to −25° C., though typically about −40° C.

The outlet of the turbo expander 231A is coupled to an inlet of the fractionation device 230.

Additionally, the top outlet of the fractionation device 230 is coupled to an inlet of a compressor 231B which is mechanically coupled to the turbo expander 231A, for compressing the low density components from the fractionation device before further cooling in heat exchanger 234.

Typically, the pressure in the fractionation section can be set lower—typically between 25 and 55 bar—than the pressure of the gas stream entering in the expansion cooling and separation section.

Advantageously, by application of the compressor 231B it is achieved to decouple the pressure of the gas stream in the fractionation column 230 (or more generally the fractionation section 115) from the pressure of the stream feeding the expansion cooling and separation section 120. As a result the process parameters in the fractionation section can be set independent from the process parameters in the expansion cooling and separation section. In this manner the fractionation process can be selectively optimized irrespective of the subsequent processing in the expansion cooling and separation section. The typical pressure in the fractionation column is in the range of 25-55 bar whilst the pressure at the inlet of the expansion cooling and separation section 120 is in the range of 40-75 bar, typically about 60 bar.

Further, the outlet of the reboiler 236 for producing liquid CO2 is coupled to the coolant side of the heat exchanger 234 so as to use the liquid CO2 as a coolant by reducing the pressure of said liquid CO2 to typically 5-10 bar. The stream leaving the heat exchanger 234 which is connected to an inlet of fractionation separator vessel 232 is cooled in said heat exchanger in a temperature range between −35 and −55° C. though typically about −52° C.

A further modification relates to the expansion cooling section 120. The top outlet of the separator vessel 242 is coupled to the dehydrated gas stream line 12 to re-introduce the low density gas stream with the dehydrated feed gas stream 12 into the pre-cooler section. Since the top outlet of vessel 242 may still contain too much of the second component with respect to the allowable concentration of said second component in the export stream 30, a recycle of said top outlet to the feed gas stream 12 is required. In this embodiment, a further compressor 249 is arranged in between the top outlet of the separator vessel 242 and the dehydrated gas stream line 12. The low density (gas) components from the separator vessel 242 pass through the further compressor 249 for compressing the low density (gas) components to a similar pressure as the dehydrated feed gas stream.

Figure 6:
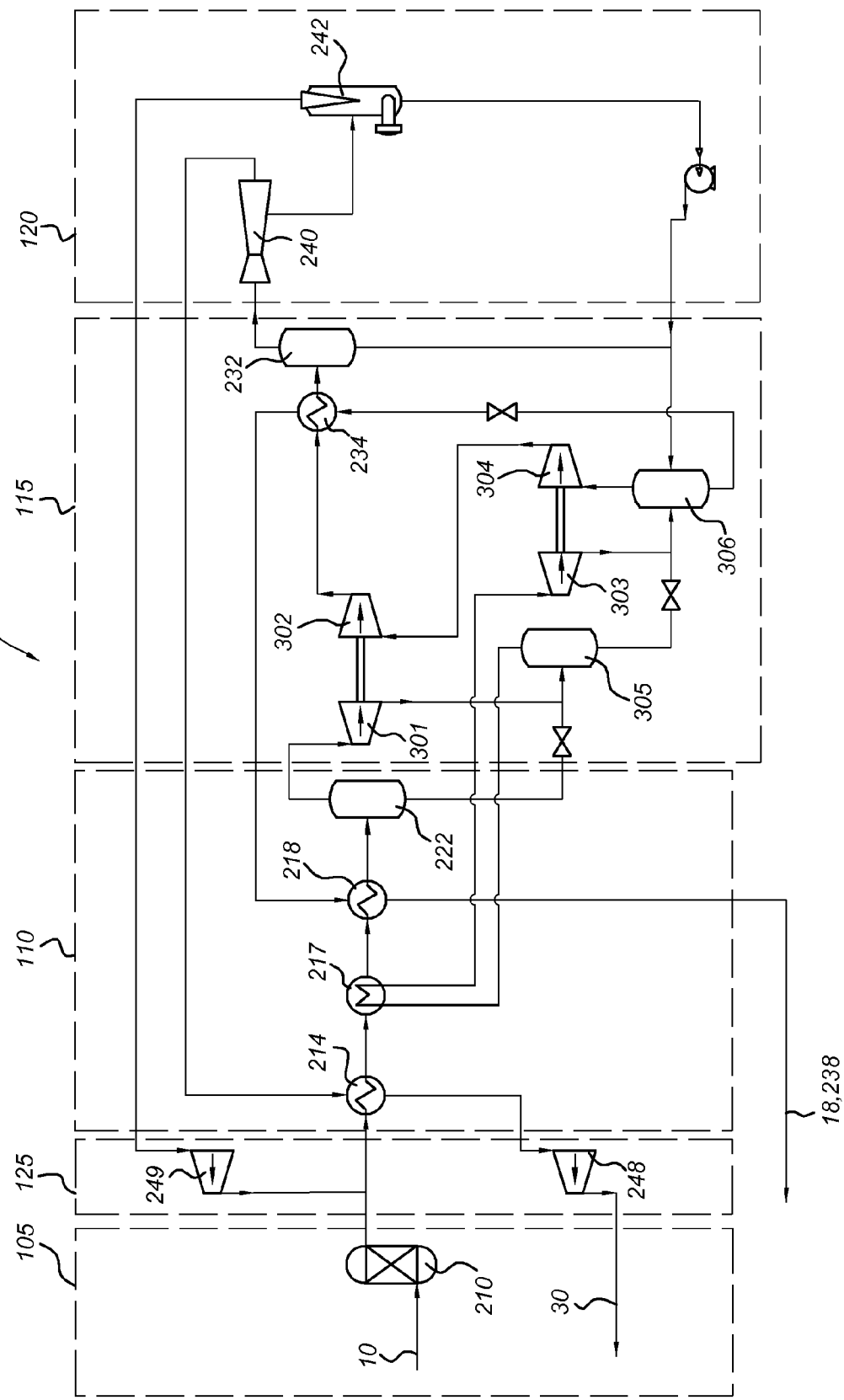
FIG. 6 shows schematically a refining system according to an embodiment.

FIG. 6 shows schematically a refining system 100D according to an embodiment of the present invention.

The refining system 100D comprises the processing blocks 105, 110, 115, 120, 125 as described above with reference to FIG. 1.

In FIG. 6, entities with the same reference number as shown in a preceding figure refer to corresponding entities. Such entities are either substantially identical or equivalent to the corresponding entities in the preceding figure and will not described here in detail.

The embodiment of the refining system 100D may be suitable for relatively moderate CO2 content of the feed gas ranging between 35-60 mole % CO2. In an example, the feed gas stream 10 from the gas field comprises natural gas with about 50 mole % CO2.

In this embodiment, the fractionation section 115 comprises a cascade of turbo expanders/compressors 301, 302; 303, 304 and associated separation vessels 305; 306 for fractionation of the dehydrated and pre-cooled gas stream into a stream of low density (gas) components and a stream of high density liquid components enriched in the second component.

The top outlet of the pre-cooler separator vessel 222 is coupled to an inlet of a first turbo expander 301 for a stream of low density components, said stream having a temperature ranging between −30 and −10° C. when entering the first turbo expander. An outlet of the first turbo expander 301 is coupled to an inlet of a first separator vessel 305 for receiving the stream from the first turbo expander. In an exemplary embodiment, said stream has a pressure ranging between 30 and 50 bar typically about 45 bar, and a temperature ranging between −50 to −30° C. typically about −38° C.

Additionally, the bottom outlet of the pre-cooler separator vessel 222 is coupled to the inlet of the first separator vessel 305 for a stream of liquid components enriched in the second component.

The first turbo expander 301 is mechanically coupled to a first associated compressor stage 302 for driving the first compressor stage.

A top outlet of the first separator vessel 305 is coupled to an inlet of a second turbo expander 303 for a stream of low density components through the second turbo expander.

The top outlet of the first separator vessel 305 is coupled to the inlet of the second turbo expander 303 through an intermediate heat exchanger 217 in between the cooling units 214, 218 of the pre-cooler section 110 so as to cool the stream before entering the second turbo expander 303.

An outlet of the second turbo expander 303 is coupled to an inlet of a second separator vessel 306 for receiving the stream from the second turbo expander 303. Said stream having a pressure in the range of 15 to 35 bar typically about 25 bar and temperature ranging between −65 and −40° C. typically about −57° C.

Additionally, the bottom outlet of the first separator vessel 305 for liquid components enriched in the second component is coupled to the inlet of the second separator vessel 306.

The second turbo expander 303 is mechanically coupled to a second associated compressor stage 304 for driving the second compressor stage.

A top outlet of the second separator vessel 306 for a stream of low density components is coupled to an inlet of the second associated compressor 304 for compressing the stream of low density components such that the pressure of said stream is raised to typically about 33 bar and within the range of 25 to 40 bar.

An outlet of the second associated compressor 304 is coupled to an inlet of the first associated compressor 302. The compressed stream of low density components from the second associated compressor is further compressed by the first associated compressor resulting in a pressure of typically about 60 bar and within a range of 40 to 75 bar.

An outlet of the first associated compressor 302 is coupled to an inlet of the heat exchanger 234 for cooling the twice compressed stream of low density components such that the temperature is lowered to a range of −65 to −45° C.

Figure 7:
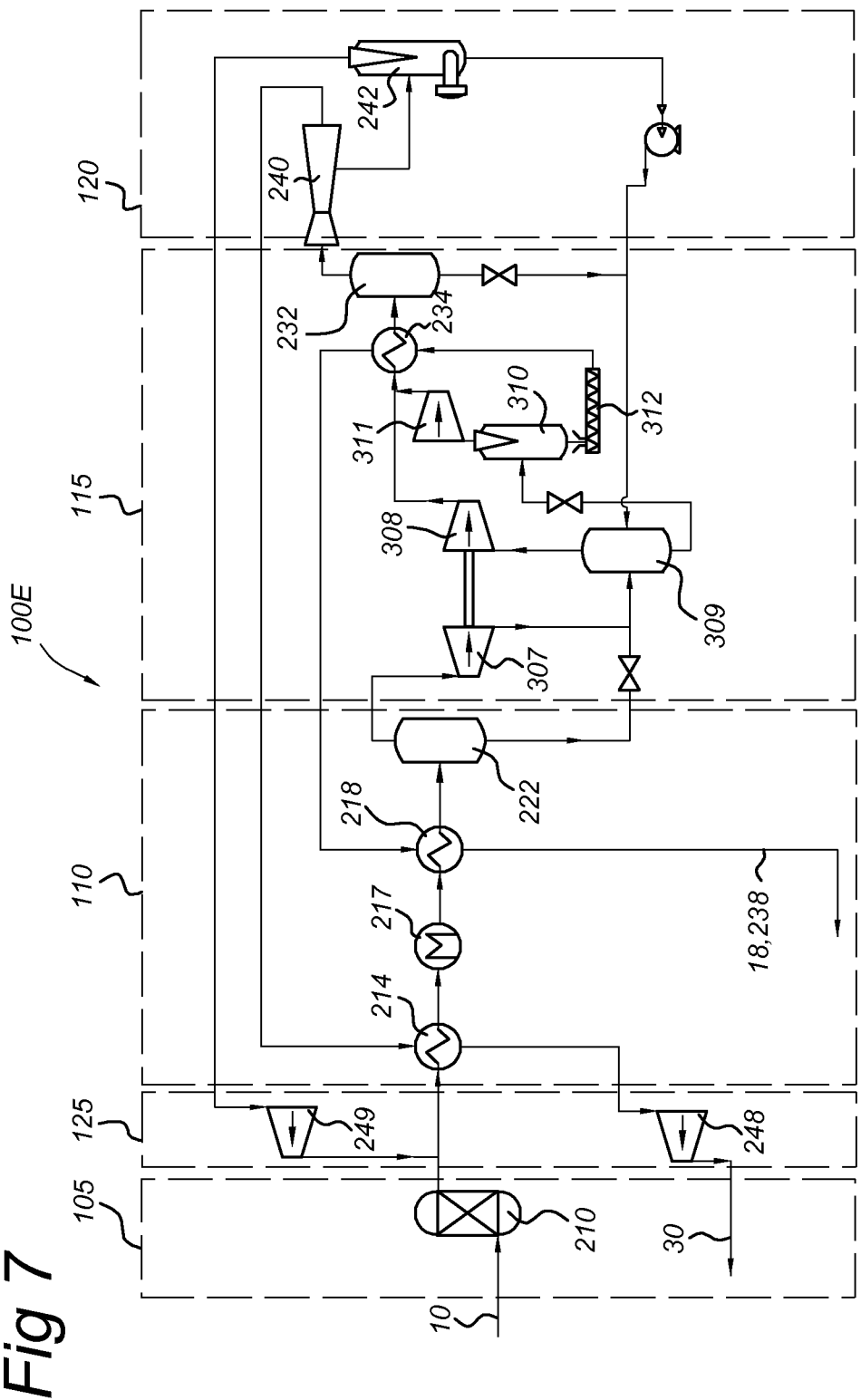
FIG. 7 shows schematically a refining system according to an embodiment.

FIG. 7 shows schematically a refining system 100E according to an embodiment of the present invention.

The refining system 100E comprises the processing blocks 105, 110, 115, 120, 125 as described above with reference to FIG. 1.

In FIG. 7, entities with the same reference number as shown in the preceding figures refer to corresponding entities. Such entities are either substantially identical or equivalent to the corresponding entities in the preceding figure and will not described here in detail.

The embodiment of the refining system 100E may be suitable for relatively moderate CO2 content of the feed gas typically in the range of 35-60 mole %. In an example, the feed gas stream 10 from the gas field comprises natural gas with about 50 mole % CO2.

In this embodiment, the fractionation section 115 comprises a turbo expander/compressor 307, 308 and an associated separation vessel 309 for fractionation of the dehydrated and pre-cooled gas stream into a stream of low density (gas) components and a stream of high density liquid components enriched in the second component. In an exemplary embodiment, said column is operating in a pressure range of typically 30-50 bar, preferably 35-45 bar and in a temperature range in the fractionation column top of −30 to −50° C. and preferably about −45° C.

Additionally, the fractionation section 115 comprises a crystallization separator vessel 310, a secondary compressor 311 and a solid conveyor 312.

The top outlet of the pre-cooler separator vessel 222 is coupled to an inlet of the turbo expander 307 for a stream of low density components through the first turbo expander. An outlet of the turbo expander 307 is coupled to an inlet of the associated separation vessel 309 for receiving the stream from the first turbo expander at pressure ranging from 30 to 50 bar and temperature ranging from −30 to −50° C.

Additionally, the bottom outlet of the pre-cooler separator vessel 222 is coupled to the inlet of the associated separation vessel 309 for a stream of liquid components enriched in the second component.

The turbo expander 307 is mechanically coupled to the associated compressor stage 308 for driving the first compressor stage. An outlet of the associated compressor 308 for a compressed stream of low density components is coupled to the heat exchanger 234 to cool the compressed gas to a temperature of typically about −55° C. and in the range of −35 to −65° C.

A top outlet of the associated separation vessel 309 for a stream of low density components is coupled to an inlet of the associated compressor 308 for compressing the stream of low density components up to pressure of typically about 60 bar and in the range of 50-75 bar.

A bottom outlet of the associated separation vessel 309 for liquid components enriched in the second component is coupled to an inlet of the crystallization separator vessel 310.

A top outlet of the crystallization separator vessel 310 is coupled through the secondary compressor 311 to the heat exchanger 234 for passing a stream of low density components from the crystallization separator vessel 310 to the heat exchanger 234. The secondary compressor is arranged for compressing the stream of low density components from the crystallization separator vessel 310 to obtain a stream with a substantially equal pressure as the pressure of the stream of low density components from the associated compressor 308, which pressure can range from typically 50-75 bar.

The crystallization separator vessel 310 is arranged for crystallizing CO2 from the liquid components produced from the bottom side of the associated separation vessel 309. Said liquids are induced to an isenthalpic flash using a throttle valve and further fed to said crystallization vessel which is operated in a pressure range of 5-15 bar, typically about 7 bar. The temperatures in said crystallization vessel can range from −80 to −65° C. At these process conditions a substantial part of the second component (e.g. CO2) is in solid state whilst the other components are present in predominantly the vapor phase. The crystallization of CO2 therefore causes C1, C2, C3 hydrocarbons to be effectively separated from CO2 due to the minimal solubility of hydrocarbons in solid state CO2. Instead of using said throttling valve for flashing the liquid stream, a cyclonic expansion and separation device (cyclonic separator device) as described in WO2009084945 or FIG. 2 can be used which will result in a more isentropic flash and therefore a deeper cooling than obtained with a throttling valve. Said cyclonic expansion and separation device is especially suitable when the fraction of hydrocarbons (C1, C2, C3 etc) is relatively large, typically more than 20 mole %. From said cyclonic separator device the CO2 enriched stream is fed to the crystallization vessel 310 and the methane enriched stream is fed to the secondary compressor 311. When operating such cyclonic separator device the preferred pressure and temperature range in said associated separation vessel 309 is respectively 50-80 bar and −30-−60° C. Consequently, at said pressure and temperature ranges the gas streams evolving from the top outlets of vessels 222 and 309, will become negligible small once the feed stream contains more than 60 mole % CO2. In those cases the function of the pre cooler separator vessel 222, turbo expander 307 and the associated compressor 308 and associated separator vessel 309 become obsolete, hence can be omitted from the process scheme.

The crystallization separator vessel 310 has a bottom outlet for solidified CO2 that is coupled to an inlet of a solid conveyor 312 which is arranged for transport the solid CO2 material to an evaporator side of the heat exchanger 234, for using the solid CO2 material as coolant.

In an embodiment, the coolant flow from the sublimated CO2 is coupled from the heat exchanger 234 to the cooling unit 218 in the pre-cooler section 110 for use as coolant in the cooling unit. After passing the cooling unit 218, the CO2 stream may be compressed for further use.

Figure 8:
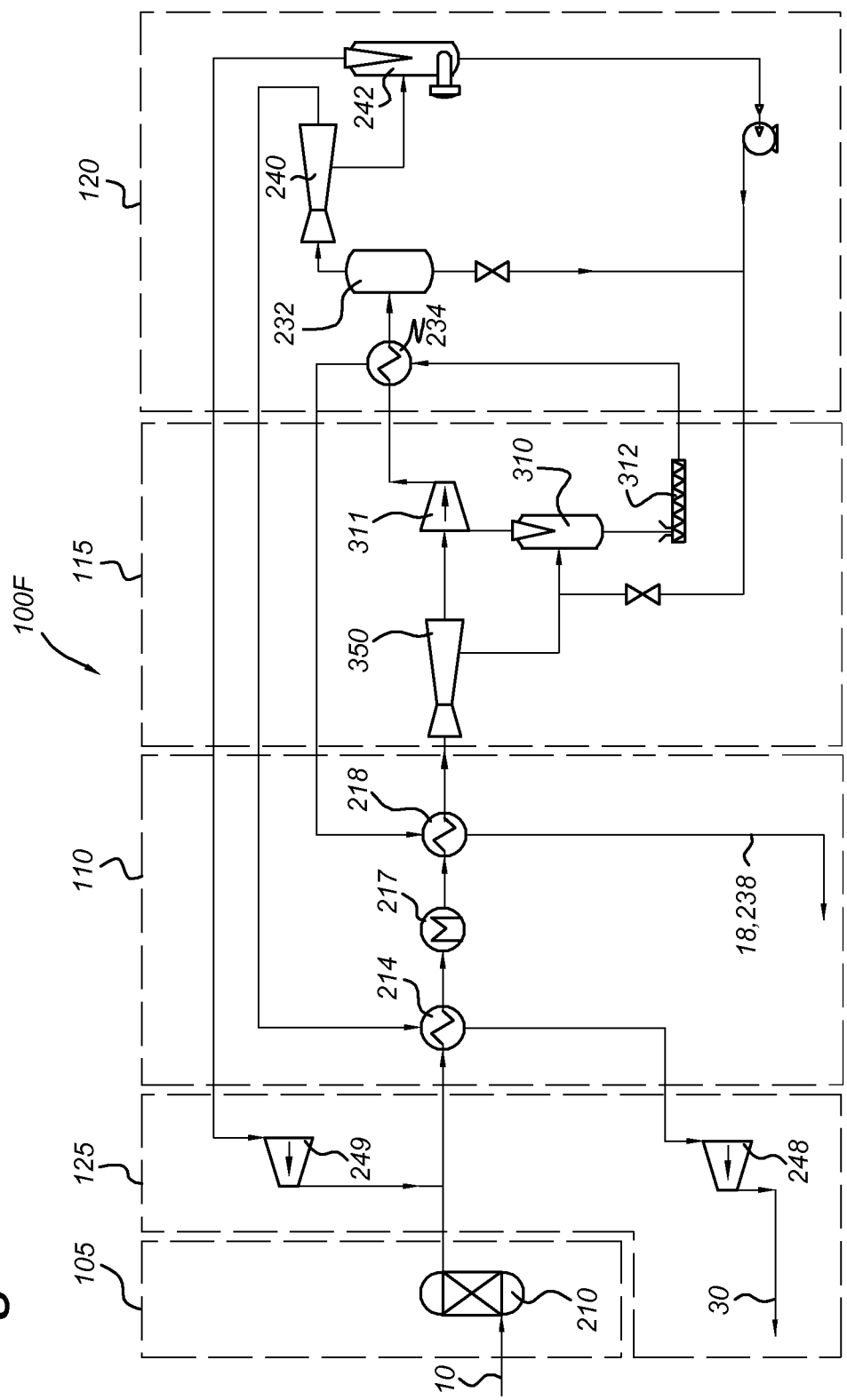
FIG. 8 shows schematically a refining system according to an embodiment.

FIG. 8 shows schematically a refining system 100F according to an embodiment of the present invention.

The refining system 100F comprises the processing blocks 105, 110, 115, 120, 125 as described above with reference to FIG. 1.

In FIG. 8, entities with the same reference number as shown in the preceding figures refer to corresponding entities. Such entities are either substantially identical or equivalent to the corresponding entities in the preceding figure and will not described here in detail.

In the embodiment of FIG. 8, the refining system comprises instead of said throttling valve (in FIG. 7) for flashing the liquid stream, a second cyclonic separator device 350 which will provide the refining system with a more isentropic flash and therefore a deeper cooling than would be obtained with a throttling valve. After passing the one or more pre-cooling units 214, 218, the liquid stream or part thereof is passed to an inlet of the second cyclonic expansion and separation device 350.

The second cyclonic separator device 350 is functionally similar to the device as described with reference to FIG. 2, and in this embodiment is especially suitable when the fraction of hydrocarbons (C1, C2, C3 etc) is relatively large, typically more than 20 mole %.

The second cyclonic separator device 350 comprises a first outlet for a stream of low density components (i.e. methane enriched stream) and a second outlet for a stream of relatively high density components (i.e. a CO2 enriched stream)

From the cyclonic separator device the CO2 enriched stream is fed from its first outlet to the crystallization vessel 310 and the methane enriched stream from its second outlet is fed to the heat exchanger 234.

From the crystallization vessel 310 a top outlet is coupled to the inlet of a secondary compressor 311 for feeding the low density component stream from vessel 310 to the heat exchanger 234. The crystallization separator vessel 310 has a bottom outlet for solidified CO2 that is coupled to an inlet of a solid conveyor 312 which is arranged for transport the solid CO2 material to an evaporator side of the heat exchanger 234, for using the solid CO2 material as coolant.

It should be noted that the above-mentioned embodiments illustrate rather than limit the invention, and that those skilled in the art will be able to design alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may embody any further alternative, modification or equivalent, only limited by the scope of the appended claims.

The invention claimed is:

1. A refining system (100; 100A; 100B; 100C; 100D; 100E) for refining a feed gas stream (10) comprising volatile hydrocarbons as a first component, carbon-dioxide as a second component and water vapour, the volatile hydrocarbons having a lower dew point temperature than the carbon dioxide, the refining system comprising:
an input section (105) for input of the feed gas stream (10), the input section comprising a dehydration unit for dehydrating the feed gas stream, capable of obtaining a water dew point of the feed gas stream between −45° C. and −65° C.;
a pre-cooling section (110) coupled to the input section (105) for receiving the dehydrated feed gas stream, the pre-cooling section being configured for (i) pre-cooling the received dehydrated feed gas stream below a dew point of a part of the received dehydrated feed gas to form a pre-cooled dehydrated feed gas comprising a liquid enriched with carbon dioxide and a gas enriched with volatile hydrocarbons, and (ii) separating liquid components comprising a first portion of the liquid enriched with carbon dioxide and a pre-cooled mixed stream comprising a remaining portion of the liquid enriched with carbon dioxide and the gas enriched with volatile hydrocarbons from the pre-cooled dehydrated feed gas;
a fractionation section (115) coupled to the pre-cooling section (110) for receiving the pre-cooled mixed stream, the fractionation section being configured for fractionating the pre-cooled mixed stream into a first fractionated stream of gas enriched with volatile hydrocarbons at a first separation outlet and a second fractionated stream of a liquid enriched with carbon dioxide at a second separation outlet, the fractionation section (115) comprising:
a heat exchanger (234) configured for cooling the first fractionated gas stream and for receiving a liquid carbon dioxide enriched stream formed in the pre-cooling section (110) as a coolant to cool the first fractionated gas stream as to form a cooled first fractionated gas stream comprising a liquid fraction enriched with carbon dioxide and a gas enriched with volatile hydrocarbons, the heat exchanger having an outlet for releasing the cooled first fractionated gas stream, and
a fractionation separator vessel (232) being configured for separating the carbon dioxide enriched liquid of the cooled first fractioned gas stream via a bottom outlet of said vessel and the gas enriched with volatile hydrocarbons of the cooled first fractionated gas stream via a top outlet of said vessel;
an expansion cooling and separation section (120) coupled to the fractionation section (115) for receiving the gas enriched with volatile hydrocarbons of the cooled first fractionated gas stream, the expansion cooling and separation section comprising:
a supersonic cyclonic separator (240), being configured for:
(a) at an inlet receiving the gas enriched with volatile hydrocarbons of the cooled first fractionated gas stream, from the fractionation separator vessel (232),
(b) expanding the gas enriched with volatile hydrocarbons of the cooled first fractionated gas stream, thereby further cooling the gas enriched with volatile hydrocarbons of the cooled first fractionated gas stream to a temperature and pressure below the dew point of the gas at which a supercooled carbon dioxide liquid is formed and forming a supercooled first fractionated gas stream,
(c) separating said supercooled first fractionated gas stream into a cooled low density fluid fraction, which is enriched with volatile hydrocarbons, and a supercooled high density fluid fraction which is enriched with carbon dioxide and volatile hydrocarbons depleted, and (d) creating a first flow of the cooled low density fluid fraction at a first flow outlet (22) and a second flow of the supercooled high density fluid fraction enriched with carbon dioxide at a second flow outlet, and a crystallization separator vessel (242) coupled to the second outlet of the supersonic cyclonic separator (240) and being configured for:
(a) receiving the second flow of the supercooled high density fluid fraction from the supersonic cyclonic separator (240),
(b) solidifying the carbon dioxide component of the supercooled high density fluid fraction,
(c) separating the solidified fraction and liquid fraction from the supercooled high density gas fluid fraction, and
(d) melting the solidified fraction in a bottom section of the crystallization separator vessel to form a carbon dioxide enriched liquid the crystallization separator vessel having a top outlet coupled to the first flow outlet of the supersonic cyclonic separator (240) for producing a carbon dioxide depleted gas stream and a bottom outlet for the carbon dioxide enriched liquid formed in the bottom section that is coupled to the fractionation section (115) via a reflux conduit (24) so that the carbon dioxide enriched liquid from the crystallization separator vessel is refluxed to the fractionation section (115).

2. The refining system according to claim 1 wherein the supersonic cyclonic separator (240) is further configured for:
inducing the gas enriched with volatile hydrocarbons of the cooled first fractionated gas stream to swirl thereby inducing centrifugal forces, and subsequently
inducing the swirl gas stream to expand and cool in order to form the cooled low density fluid fraction and the cooled high density fluid fraction and by means of the centrifugal forces to separate the first flow of the cooled low density fluid fraction and the second flow of the cooled high density fluid fraction.

3. The refining system according to claim 1, further comprising: a compression section (125) coupled to the expansion cooling and separation section (120) for receiving the first flow and being arranged for compressing the first flow and exporting the compressed first flow to a transport network.

4. The refining system according to claim 1, further comprising: a dehydration module (105) for removal of water from the feed gas stream, the dehydration module being arranged in the input section (105) of the refining system.

5. The refining system according to claim 1, wherein the pre-cooling section (110) comprises one or more cooling units (214, 218) for pre-cooling the dehydrated feed gas stream and a pre-cooler separation vessel (222); the pre-cooler separation vessel (222) being coupled to the one or more cooling units (214, 218) for receiving the pre-cooled dehydrated feed gas stream, the pre-cooler separation vessel having a first pre-cooler separation outlet for the pre-cooled mixed stream coupled to the fractionation section (115), and a second pre-cooler separation outlet for liquid components comprising the first portion of liquid enriched with carbon dioxide.

6. The refining system according to claim 5, wherein the fractionation section (115) comprises a fractionation column (230) having a top as the first separation outlet providing the first fractionated stream of gas enriched with volatile hydrocarbons and a bottom as the second separation outlet providing the second fractionated stream of the liquid enriched with carbon dioxide; the top of the fractionation column being coupled to the fractionation separator vessel (232) via the heat exchanger (234); the bottom of the fractionation column being coupled to a reboiler (236); the top outlet of the fractionation separator vessel (232) having a conduit from which the expansion cooling and separation section (120) receives the gas enriched with volatile hydrocarbons of the cooled first fractioned gas stream; the reboiler (236) having a reboiler reflux conduit to reflux a first portion of the second fractioned stream of the liquid enriched with carbon dioxide to the fractionation column (230) and a exit conduit (238) for removal of a remaining portion of the second fractionated stream of the liquid enriched with carbon dioxide.

7. The refining system according to claim 6, wherein the heat exchanger (234) is arranged between the top of the fractionation column (230) and the fractionation separator vessel (232) for cooling the first fractionated gas stream from the top of the fractionation column to the fractionation separator vessel.

8. The refining system according to claim 6, wherein the second pre-cooler separation outlet of the pre-cooler separation vessel (222) is coupled to a coolant side of the one or more cooling units (214, 218) for providing the liquid components comprising the first portion of the liquid enriched with carbon dioxide from the pre-cooled dehydrated feed gas as coolant to the cooling units.

9. The refining system according to claim 7, wherein the second pre-cooler separation outlet of the pre-cooler separation vessel (222) is controllably coupled to a coolant side of the heat exchanger (234) for providing the liquid comprising the first portion of the liquid enriched with carbon dioxide from the pre-cooled dehydrated feed gas as coolant to the heat exchanger.

10. The refining system according to claim 9, further comprising a compressor (235) for compressing the coolant down stream of the heat exchanger (234) and for providing a compressed feed gas stream to the fractionation column (230).

11. The refining system according to claim 1, wherein the pre-cooling section (110) comprises a expander stage (215) of a turbo expander/compressor (215, 248); the expander stage having an expander inlet coupled to the input section (105) for receiving the dehydrated feed gas stream (10) and an expander outlet coupled to an inlet of a fractionation column (230) of the fractionation section (115), wherein a chiller device (215b) is arranged between the expander outlet and the fractionation column, and wherein a compressor stage (248) of the turbo expander is arranged in a compression section (125) in fluid communication with the expansion cooling and separation section (120) for receiving and compressing the first flow from the cyclonic separator (240), and the fractionation section (115) comprises a chiller (235) arranged between a top outlet of the fractionation column (230) and the expansion cooling and separation section (120).

12. The refining system according to claim 6, wherein the pre-cooling section (110) comprises a first cooling unit (214) and a second cooling unit (218), the first cooling unit being upstream of the second cooling unit in the feed gas stream, wherein the first cooling unit (214) on a coolant side is coupled to the first flow outlet of the cyclonic separator (240) for receiving the first flow of the cooled low density fluid fraction as coolant and the second cooling unit (218) on a coolant side is coupled to the exit conduit (238) for receiving the remaining portion of the second fractionated stream of the liquid enriched with carbon dioxide from the reboiler (236).

13. The refining system according to claim 12, comprising an intermediate chiller (217) arranged between the first and second cooling units (214, 218), wherein the first cooling unit (214) on the coolant side comprises an outlet coupled to a compression section (125) which is arranged for compressing the first flow of the cooled low density fluid fraction after passing the first cooling unit.

14. The refining system according to claim 6, wherein a compressor (231b) of a turbo expander/compressor (231a, 231b) is coupled by a conduit between the top of the fractionation column (230) and the heat exchanger (234) for compressing the first fractionated gas stream from the top before entering the fractionation vessel (232).

15. The refining system according to claim 14, wherein the turbo expander/compressor (231a, 231b) comprises an expander stage (231a) arranged between the first separation outlet of the pre-cooler separation vessel (222) and an inlet of the fractionation column (230).

16. The refining system according to claim 5, wherein the fractionation section (115) comprises at least a first and a second turbo expander (301, 302; 303, 304), a first and second associated separation vessel (305, 306), wherein an expander stage (301) of the first turbo expander is coupled at a first inlet to the first pre-cooler separation outlet of the pre-cooler separation vessel (222) for receiving the pre-cooled mixed stream; a first outlet of the expander stage (301) of the first turbo expander being coupled to an inlet of the first associated separation vessel (305); an outlet of the first associated separation vessel (305) being coupled to an inlet of the expander stage (303) of the second turbo expander, and an outlet of the expander stage (303) of the second turbo expander being coupled to an inlet of the second associated separation vessel (306); a first outlet of the second associated separation vessel (306) being the first separation outlet providing the first fractionated stream of the gas enriched with volatile hydrocarbons and coupled to an inlet of the compressor stage (304) mechanically coupled to the second turbo expander (303); a second outlet of the second associated separation vessel (306) being the second separation outlet providing the second fractionated stream of a liquid enriched with carbon dioxide; an outlet of the compressor stage (304) of the second turbo expander being coupled to an inlet of the compressor stage (302) mechanically coupled to the first turbo expander (301).

17. The refining stage according to claim 16, wherein an outlet of the compressor stage (302) of the first turbo expander is coupled to an inlet of the heat exchanger (234).

18. The refining system according to claim 16, wherein a conduit from the outlet of the first storage vessel (305) passes through a coolant side of an intermediate heat exchanger (217) arranged in the pre-cooling section (110) for cooling the dehydrated feed gas stream, to the inlet of the expander stage (303) of the second turbo expander.

19. The refining system according to claim 16, wherein the second pre-cooler separation outlet of the pre-cooler separation vessel (222) for output of liquid components comprising the first portion of liquid enriched with carbon dioxide is coupled to the inlet of the first associated separation vessel (305), and a second outlet of the first associated separation vessel for output of liquid components enriched with carbon dioxide is coupled to the inlet of the second associated separation vessel (306).

20. The refining system according to claim 16, wherein the second outlet of the second associated separation vessel providing the second fractionated stream of the liquid enriched with carbon dioxide for liquid components enriched with carbon dioxide is coupled to a coolant side of the heat exchanger (234).

21. The refining system according to claim 5, wherein the fractionation section (115) comprises a turbo expander/compressor (307, 308) and an associated separation vessel (309); an expander stage (307) of the turbo expander/compressor of which an inlet is coupled with a first pre-cooler separation outlet of the pre-cooler separation vessel (222) for receiving the pre-cooled mixed stream, an outlet of the expander stage (307) being coupled with an inlet of the associated separation vessel (309); an outlet for gaseous components of the associated separation vessel (309) being the first separation outlet providing the first fractionated stream of the gas enriched with volatile hydrocarbons and being coupled with an inlet of a compressor stage (308) of the turbo expander/compressor, an outlet of the compressor stage being coupled with an inlet of the heat exchanger (234).

22. The refining system according to claim 21, wherein the fractionation section (115) comprises a second associated separation vessel (310) and a compressor (311), wherein the first associated separation vessel (309) comprises an outlet for liquid components, the outlet being the second separation outlet providing the second fractionated stream of the liquid enriched with carbon dioxide and being coupled with an inlet of the second associated separation vessel (310) for receiving the liquid components; a first outlet for gaseous components of the second associated separation vessel being coupled with an inlet of the compressor (311), an outlet of the compressor being coupled with the inlet of the heat exchanger (234).

23. The refining vessel according to claim 22, wherein the second associated separation vessel (310) is arranged for forming a solid phase material enriched with carbon dioxide and the second associated separation vessel is arranged with a second outlet for output of the solid phase material, the second outlet being coupled to a solid conveyor (312) which is arranged for transport of the solid phase material to an evaporator side of the heat exchanger (234) for providing the solid phase material as coolant to the intermediate heat exchanger.

24. The refining system according to claim 1, wherein at least one of the bottom outlet of the fractionation separator vessel (232) and the bottom outlet of the crystallization separator vessel (242) is coupled to the input section (105) for use of carbon dioxide enriched liquid as a desiccant.

25. The refining system according to claim 1, wherein the second flow outlet of the supersonic cyclonic separator (240) is coupled to the pre-cooling section (110) for use of the second flow of the supercooled high density fluid fraction as coolant for the feed gas stream (10).

26. The refining system according to claim 1, wherein the gas enriched with volatile hydrocarbons comprises one of more of C1, C2, C3 and C4 hydrocarbons, and the liquid enriched with carbon dioxide at least one or more of carbon dioxide and hydrogen sulfide.

27. The refining system according to claim 26, wherein the fractionation section (115) is arranged to receive the pre-cooled mixed stream at a temperature between −5 and −30° C. at a pressure between 40 and 70 bar.

28. The refining system according to claim 26, wherein the expansion and separation section (120) is arranged to receive the gas enriched with volatile hydrocarbons of the cooled first fractionated gas stream at a pressure between 55 and 65 bar and at a temperature between −55 and −20° C.

29. A method for refining a gas stream comprising volatile hydrocarbons as a first component, carbon dioxide as a second component and water vapour, the first component having a lower dew point temperature than the second component;
the method comprising in sequence:
  a) receiving a feed gas stream and dehydrating the feed gas stream, a part of the received dehydrated feed gas having a water dew point between −45° C. and −65° C.;
  b) pre-cooling the received dehydrated feed gas stream below a dew point of the part of the received dehydrated feed gas to form a pre-cooled mixed stream comprising a liquid enriched with carbon dioxide and a gas stream enriched with volatile hydrocarbons;
  c) fractionating the pre-cooled mixed stream into a first fractionated stream of gas enriched with volatile hydrocarbons at a first separation outlet and a second fractionated stream of a liquid enriched with carbon dioxide at a second separation outlet;
  d) expansion cooling and separating of the first fractionated gas stream, comprising:
    (i) receiving the first fractionated gas stream, from the first separation outlet through a heat exchanger, which is arranged for cooling the first fractionated gas stream and for receiving an upstream liquid carbon dioxide enriched stream, upstream from a supersonic cyclonic separator stage as a coolant;
    (ii) expanding the first fractionated gas stream to supersonic velocity, thereby further cooling the first fractionated gas stream to a temperature and pressure below the dew point of part of the first fractionated gas stream;
    (iii) separating the cooled first fractionated gas stream into a cooled low density fluid fraction, which is carbon dioxide depleted and volatile hydrocarbons enriched, and a cooled high density fluid fraction which is carbon dioxide enriched and volatile hydrocarbons depleted;
    (iv) creating a first flow of the cooled low density fluid fraction at a first flow outlet (7) and a second flow of the cooled high density fluid fraction at a second flow outlet (6), separated from the first flow, and
    (v) separating a further liquid enriched with carbon dioxide from the second flow of the cooled high density fluid fraction, and refluxing the further liquid enriched with carbon dioxide to the fractionation step; wherein said separating a further liquid enriched with carbon dioxide from the second flow of the cooled high density fluid fraction, and said refluxing the further liquid enriched with carbon dioxide to the fractionation step comprises: using crystallization separation (242), arranged for receiving the second flow and for separating the further liquid enriched with carbon dioxide from the second flow of the cooled high density fluid fraction, wherein the crystallization separation is arranged for solidifying the carbon dioxide from the second flow of the cooled high density fluid fraction, the carbon dioxide solids being melted as the further liquid enriched with carbon dioxide from the second flow of the cooled high density fluid fraction, the further liquid being refluxed to the fractionation section.

30. The method according to claim 29, wherein the expansion to supersonic velocity comprises
inducing the cooled first fractionated gas stream to swirl thereby inducing centrifugal forces to form the cooled low density fluid fraction and the cooled high density fluid fraction subjected to said separating.

* * * * *